(12) United States Patent
Cook et al.

(10) Patent No.: US 12,010,098 B2
(45) Date of Patent: *Jun. 11, 2024

(54) ENFORCING A SEGMENTATION POLICY IN CO-EXISTENCE WITH A SYSTEM FIREWALL

(71) Applicant: Illumio, Inc., Sunnyvale, CA (US)

(72) Inventors: Daniel Richard Cook, San Jose, CA (US); Anish Vinodkumar Desai, Palo Alto, CA (US); Thomas Michael McCormick, San Jose, CA (US)

(73) Assignee: ILLUMIO, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,899

(22) Filed: Jul. 6, 2023

(65) Prior Publication Data

US 2023/0353540 A1 Nov. 2, 2023

Related U.S. Application Data

(60) Continuation of application No. 17/730,062, filed on Apr. 26, 2022, now Pat. No. 11,736,443, which is a
(Continued)

(51) Int. Cl.
*H04L 9/40* (2022.01)
*G06F 9/38* (2018.01)
(Continued)

(52) U.S. Cl.
CPC ........ *H04L 63/0263* (2013.01); *G06F 9/3826* (2013.01); *G06F 9/4486* (2018.02);
(Continued)

(58) Field of Classification Search
CPC ............ H04L 63/0263; H04L 41/0803; H04L 41/0894; H04L 43/04; H04L 63/0227;
(Continued)

(56) References Cited

U.S. PATENT DOCUMENTS 7,610,621 B2 * 10/2009 Turley ................ H04L 63/0263
726/11
9,059,960 B2 6/2015 Burchfield et al.
(Continued)

OTHER PUBLICATIONS

Cisco, "Security Configuration Guide: Zone-Based Policy Firewall, Cisco IOS XE Release 3S," Jan. 21, 2018, pp. 1-100, [Online] [Retrieved on Feb. 11, 2020] Retrieved from the Internet <URL: https://www.cisco.com/c/en/us/td/docs/ios-xml/ios/sec_data_zbf/configuration/xe-3s/sec-data-zbf-xe-book.pdf>.
(Continued)

*Primary Examiner* — Cheng-Feng Huang
(74) *Attorney, Agent, or Firm* — Fenwick & West LLP (57) ABSTRACT

A segmentation firewall executing on a host enforces a segmentation policy. In a co-existence mode, the segmentation firewall operates in co-existence with a system firewall that enforces a security policy. The segmentation firewall is configured to either drop packets that do not match any permissive rule or pass packets that match a permissive rule to the system firewall to enable the system firewall to determine whether to drop or accept the passed packets. To enable efficient operation of the segmentation firewall when operating in co-existence with the system firewall, the segmentation firewall may include a plurality of rule chains and may be configured to exit a chain and bypass remaining rule chains upon an input packet matching a permissive rule of the segmentation policy.

20 Claims, 8 Drawing Sheets

Related U.S. Application Data division of application No. 16/224,746, filed on Dec. 18, 2018, now Pat. No. 11,336,620.

(51) Int. Cl.
  *G06F 9/448* (2018.01)
  *H04L 41/0803* (2022.01)
  *H04L 41/0894* (2022.01)
  *H04L 43/04* (2022.01)
  *H04L 41/0895* (2022.01)
  *H04L 41/40* (2022.01)

(52) U.S. Cl.
  CPC ...... *H04L 41/0803* (2013.01); *H04L 41/0894* (2022.05); *H04L 43/04* (2013.01); *H04L 63/0227* (2013.01); *H04L 63/0236* (2013.01); *H04L 63/0254* (2013.01); *H04L 63/20* (2013.01); *H04L 41/0895* (2022.05); *H04L 41/40* (2022.05)

(58) Field of Classification Search
  CPC . H04L 63/0236; H04L 63/0254; H04L 63/20; H04L 41/0895; H04L 41/40; H04L 41/069; G06F 9/3826; G06F 9/4486
  See application file for complete search history.

(56) References Cited

U.S. PATENT DOCUMENTS

| | | | |
|---|---|---|---|
| 9,172,640 B2 | 10/2015 | Vincent et al. | |
| 10,608,993 B2 | 3/2020 | Bansal et al. | |
| 11,411,822 B2 | 8/2022 | Fainberg | |
| 2007/0101421 A1* | 5/2007 | Wesinger, Jr. | H04L 61/4511 726/11 |
| 2011/0219035 A1* | 9/2011 | Korsunsky | H04L 63/102 707/E17.005 |
| 2013/0019277 A1 | 1/2013 | Chang et al. | |
| 2014/0130119 A1 | 5/2014 | Goldschlag et al. | |
| 2014/0245423 A1* | 8/2014 | Lee | H04L 63/20 726/12 |
| 2015/0326530 A1 | 11/2015 | Wood | |
| 2017/0099187 A1 | 4/2017 | Dale et al. | |
| 2017/0163666 A1 | 6/2017 | Venkatramani et al. | |
| 2018/0048623 A1 | 2/2018 | Bansal et al. | |
| 2018/0063195 A1 | 3/2018 | Nimmagadda et al. | |
| 2018/0176261 A1* | 6/2018 | Bansal | H04L 41/0893 |
| 2018/0191471 A1* | 7/2018 | Elhaddad | H04L 1/24 |
| 2019/0089742 A1 | 3/2019 | Hill | |
| 2019/0190889 A1 | 6/2019 | Chanda et al. | |
| 2020/0007397 A1 | 1/2020 | Fainberg | |
| 2020/0112540 A1 | 4/2020 | Venkataraman | |

OTHER PUBLICATIONS

PCT International Search Report and Written Opinion. PCT Application No. PCT/US2019/066995, Mar. 10, 2020, 13 pages.
United States Office Action, U.S. Appl. No. 16/224,746, dated Oct. 26, 2021, 14 pages.

* cited by examiner

ENFORCING A SEGMENTATION POLICY IN CO-EXISTENCE WITH A SYSTEM FIREWALL

CROSS-REFERENCE TO RELATED APPLICATIONS

This application is a continuation of U.S. Non-Provisional patent application Ser. No. 17/730,062, filed on Apr. 26, 2022, which is a divisional of U.S. Non-Provisional application Ser. No. 16/224,746, filed on Dec. 18, 2018, both of which are incorporated by reference.

BACKGROUND

Technical Field

This application relates to enforcing a segmentation policy that controls communications between workloads.

Description of Related Art

A segmentation policy comprises a set of rules that control which workloads may communicate on a network and place restrictions on how such workloads may communicate. For example, in a large enterprise network, a segmentation policy may be designed to enable a certain groups of workloads associated with certain geographic locations, roles, applications or other characteristics to communicate with a limited set of other workloads desirable to facilitate use of certain services, while blocking communications outside the intended use of the services, thereby reducing the likelihood of malicious activity. To enforce the segmentation policy, a segmentation server distributes management instructions to hosts on which the workloads execute. The hosts to configure respective firewalls with sets of firewall rules in accordance with the segmentation policy.

SUMMARY

A segmentation firewall processes an input packet in accordance with firewall rules that enforces a segmentation policy and that co-exists with a system firewall. The segmentation firewall receives a first input packet and applies segmentation firewall rules of a rule chain of the segmentation firewall to determine if the first input packet meets respective criteria of each of the segmentation firewall rules. Responsive to the first input packet meeting criteria specified in one of the segmentation firewall rules, the segmentation firewall executes a command to exit the rule chain without dropping or accepting the first input packet. Responsive to executing the command to exit the rule chain, the segmentation firewall passes control of the first input packet to the system firewall to enable the system firewall to determine whether to drop or accept the first input packet.

The system firewall determines whether to drop or accept the first input packet based on security firewall rules associated with the system firewall. The system firewall drops the first input packet responsive to the system firewall determining to drop the first input packet. The system firewall passes the first input packet to a workload or to a network responsive to the system firewall determining to accept the first input packet.

In an embodiment, the segmentation firewall can switch from a co-existence mode to an exclusive mode. In the exclusive mode, the segmentation firewall receives a second input packet and applies the segmentation firewall rules of the segmentation firewall to determine whether to drop or accept the second input packet. The segmentation firewall drops or accepts the second input packet dependent on application of the segmentation firewall rules.

In another embodiment, the segmentation firewall can switch to a switching operation of the segmentation firewall to a monitoring mode. The segmentation firewall receives an input packet when operating in the monitoring mode and applies the segmentation firewall rules of the segmentation firewall. The segmentation firewall logs results of the application of the segmentation firewall rules without dropping or accepting the second input packet and stores a log of the results.

In an embodiment, the segmentation firewall executes a first jump command of an input module to jump to a chain selection module of the segmentation firewall. A chain selection module selects a first rule chain of the segmentation firewall. The chain selection module executes a goto command to go to the first rule chain of the segmentation firewall. The segmentation firewall executes first firewall rules in the first rule chain. Responsive to completing execution of the first firewall rules without dropping the first input packet, the segmentation firewall executes a first return command to return to a first memory location of an instruction of the input module following the first jump command.

Furthermore, the segmentation firewall may execute a second jump command to a second rule chain of the segmentation firewall. The segmentation firewall executes second firewall rules in the second rule chain. Responsive to completing execution of the second firewall rules without dropping the first input packet, the segmentation firewall executes a second return command to return to a second memory location of an instruction of the input module following the second jump command. The input module passes the first input packet to the system firewall following the second return command.

In an embodiment, selecting the first rule chain of the segmentation firewall comprises determining a packet type of the first input packet and selecting the first rule chain from a set of selectable rule chains based on the packet type.

In another embodiment, an enforcement module of a host generates firewall rules of a segmentation firewall that enforces a segmentation policy and that co-exists with a system firewall. The host receives from a segmentation server, management instructions specifying permitted communications with a workload executing on the host in accordance with the segmentation policy. The host generates based on the management instructions, a configuration of a segmentation firewall for enforcing the management instructions. The configuration comprising a sequence of firewall rules. A segmentation firewall rule of the plurality of firewall rules when executed, determines if an input packet meets criteria associated with the segmentation policy permitting the input packet. Responsive to determining that the input packet meets the criteria, the firewall rule executes a command to exit the sequence of firewall rules without dropping or accepting the input packet to enable the system firewall to determine whether to drop or accept the input packet. The sequence of firewall rules also includes a default firewall rule to drop the input packet responsive to the input packet failing to meet criteria associated with prior rules in the sequence of firewall rules. The host configures a segmentation firewall of the host in accordance with the configuration to cause the segmentation firewall to enforce the segmentation policy.

In an embodiment, the host receives an instruction to reconfigure the segmentation firewall to operate in an exclusive mode. Responsive to the instruction, the host regenerates the segmentation firewall rule to accept the packet responsive to the input packet meeting the criteria associated with the segmentation policy permitting the input packet without enabling the system firewall to determine whether to accept or drop the packet.

In an embodiment, the host receives an instruction to reconfigure the segmentation firewall to operate in a monitoring mode. Responsive to the instruction, the host regenerates the default rule to exit the sequence of firewall rules without dropping or accepting the packet to enable the system firewall to determine whether to accept or drop the packet.

In an embodiment, generating the configuration of the segmentation firewall includes generating the sequence of firewall rules to include at least a first stage rule chain and a second stage rule chain. The second stage rule chain is executed in response to the packet failing to meet the criteria for the rules of the first stage rule chain.

In an embodiment, the sequence of firewall rules includes a plurality of first stage rule chains. The configuration further comprises a chain selection module to detect a packet type of the input packet and select between one of the plurality of first stage rule chains based on the packet type.

In an embodiment, the configuration includes a goto command to enter the sequence of firewall rules. The command to exit the sequence of firewall rules comprises a return command to return to a memory location following a previous jump instruction.

In an embodiment, a non-transitory computer-readable storage medium store instructions that when executed by a processor causes the processor to perform the processes described above.

In another embodiment, a computer system includes a processor and a non-transitory computer-readable storage medium that store instructions that when executed by the processor causes the processor to perform the processes described above.

DETAILED DESCRIPTION

The Figures (FIGS.) and the following description describe certain embodiments by way of illustration only.

One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A segmentation firewall executing on a host enforces a segmentation policy. In a co-existence mode, the segmentation firewall operates in co-existence with a system firewall that enforces a security policy. The segmentation firewall is configured to either drop packets that do not match any permissive rule or pass packets that match a permissive rule to the system firewall to enable the system firewall to determine whether to drop or accept the passed packets. To enable efficient operation of the segmentation firewall when operating in co-existence with the system firewall, the segmentation firewall may include a plurality of rule chains and may be configured to exit a chain and bypass remaining rule chains upon an input packet matching a permissive rule of the segmentation policy.

Figure 1:
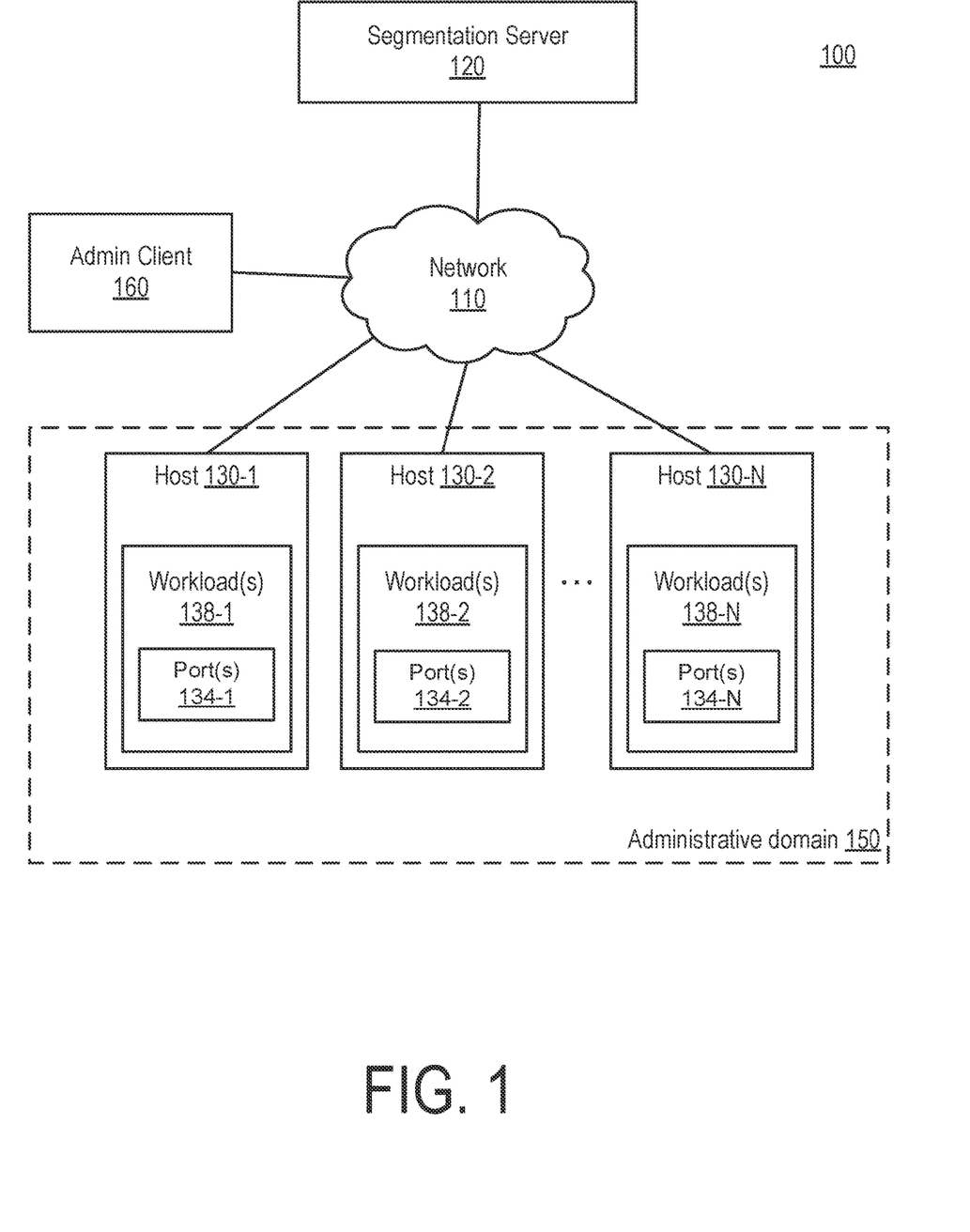
FIG. 1 is a high-level block diagram illustrating a computing environment for managing a segmentation policy, according to one embodiment.

FIG. 1 is a high-level block diagram illustrating a networked computing environment 100. The networked computing environment 100 includes a segmentation server 120, a network 110, an administrative client 160, and an administrative domain 150 that includes a plurality of hosts 130 (e.g., hosts 130-1, 130-2, . . . , 130-N). The administrative domain 150 can correspond to an enterprise such as, for example, a service provider, a corporation, a university, or a government agency under control of the segmentation server 120.

The network 110 represents the communication pathways between the segmentation server 120, the administrative client 160, and the hosts 130. In one embodiment, the network 110 uses standard communications technologies and/or protocols and can include the Internet. In another embodiment, the entities on the network 110 can use custom and/or dedicated data communications technologies.

The hosts 130 may comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the host 130. In some instances, a host 130 may operate only a single workload 138. In other instances, a host 130 may operate multiple workloads 138 that may be independently addressable and may perform different independent computing functions. The workloads 138 on the hosts 130 may communicate with other workloads 138 on different hosts 130 within the administrative domain 150 to perform various tasks.

A workload 138 communicates over one or more ports 134. A port 134 comprises a logical communication endpoint for a particular service that is provided by or used by a workload 138. A port 134 on a workload 138 may be identified by a port identifier (e.g., a port number). Specific port numbers may be used consistently across different workloads 138 in association with specific services. Thus, the port number can often identify the service and vice versa. For example, port 80 is typically used for hyper-text transfer protocol (HTTP) traffic on any workloads 138 that provide or consume HTTP-based web services and port 5432 is typically used for any TCP traffic associated with PostgreSQL database services. Communication over the ports 134 may also occur in accordance with certain specified communication protocols, which may also be associated with the service. Common protocols include, for example, the transmission control protocol (TCP), the user data protocol (UDP), and the internet control message protocol (ICMP).

The segmentation server 120 is a computer (or set of computers) that obtains and stores information about the hosts 130 on the network 120 and the workloads 138 executing on the hosts 130. The segmentation server 120 manages a segmentation policy for the administrative domain 150 that regulates communications between workloads 138 within the administrative domain 150. In an embodiment, the segmentation policy is set forth using permissive rules that specify the communications that are permitted. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on an host 130-1 is allowed to provide a particular service to a workload 138-2 operating on an host 130-2. Absent other rules, the workload 138-1 will thus be blocked from providing the service to a workload 138-N operating on an host 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, each workload 138 may belong to one or more workload groups. The workload groups may each be associated with a set of common labels assigned to the workloads in the group. The labels assigned to each workload 138 define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding host 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
|---|---|
| Role | M: The role of the workload within the administrative domain. |
| | V: web, API, database |
| Environment | M: The lifecycle stage of the workload. |
| | V: production, staging, development |
| Application | M: The logical application (higher-level grouping of managed servers) to which the workload belongs. |
| | V: trading, human resources |
| Line of Business | M: The business unit to which the workload belongs. |
| | V: marketing, engineering |
| Location | M: The location of the workload. Can be physical (e.g., country or geographical region) or logical (e.g., network). Physical is particularly useful for expressing geographic compliance requirements. |
| | V: US or EU (physical), us-west-1 or us-east-2 (logical) |
| User Group | M: The user group containing the user logged onto the workload. |
| | V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation server 120 may retain a repository storing information about the hosts 130 and the workloads 138 managed by the segmentation server 120. For example, the segmentation server 120 may store, for each host 130, workload identifiers for workloads 138 associated with the OS instance 138 and membership information indicating one or more groups of workloads 138 to which each workload 138 belong (e.g., as defined by the respective label sets for the workloads 138).

Table 2 illustrates an example of information stored by the segmentation server 120. The workload ID(s) represent the workload identifier for the workload(s) 138 executing on each host 130. The workload identifier may comprise, for example, an IP address or other identifier that uniquely identifies the workload 138. The memberships represent groups to which one or more workloads 138 executing on the host 130 belongs. Each group may correspond to a unique label set involving one or more dimensions.

TABLE 2

Example of a Repository Table

| Workload ID(s) | Memberships |
|---|---|
| ID1 | A, C, D |
| ID2 | B, C |
| ID3 | D |
| . | . |
| . | . |
| . | . |
| IDn | B, D, E, F |

Instead of enforcing the segmentation policy at a centralized device, the segmentation policy is instead enforced by at least a subset of the hosts 130. To enable enforcement of the segmentation policy, the segmentation server 120 generates a set of management instructions and distributes the management instructions to the hosts 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different hosts 130 so that each host 130 gets only the management instructions relevant to its operation. Here, the segmentation server 120 may determine which rules are relevant to a given host 130 and distribute the relevant rules to that host 130. A rule may be deemed relevant to a particular host 130 if that host 130 executes one or more workloads 138 that belongs to a group (defined by one or more label sets) referenced by the rule. The segmentation server 120 may furthermore determine which membership information is relevant to each host 130 and distribute the relevant membership information to each respective host 130. Here, membership information may be relevant to a particular host 130 if it defines membership of a group referenced by a rule deemed relevant to the particular host 130. Beneficially, the relevant rules and relevant membership information may be sent to the hosts 130 separately from each other. Independently sending relevant rules and relevant membership information may improve the efficiency of updates when the segmentation policy changes or when workloads are added or removed from the network 110. For example, in response to a change in the segmentation policy, the segmentation server 120 may send updated rules to the affected hosts 130 but need not re-send the membership information absent any changes. Similarly, in response to a change in membership information (e.g., a new workload being added to the network or being re-assigned to a new label set), the segmentation server 120 may send updated membership information to the affected hosts 130 without necessarily re-sending the rules. Further details of a segmentation system for controlling communications between hosts 130 based on labels is described in U.S. Patent Application Publication No. 2014/0373091 entitled "Distributed Network Security Using a Logical Multi-Dimensional Label-Based Policy Model," to Paul J. Kirner, et al., which is incorporated by reference herein.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the hosts 130 and workloads 138 on the network 120 and view traffic flows between the workloads 138.

Figure 2:
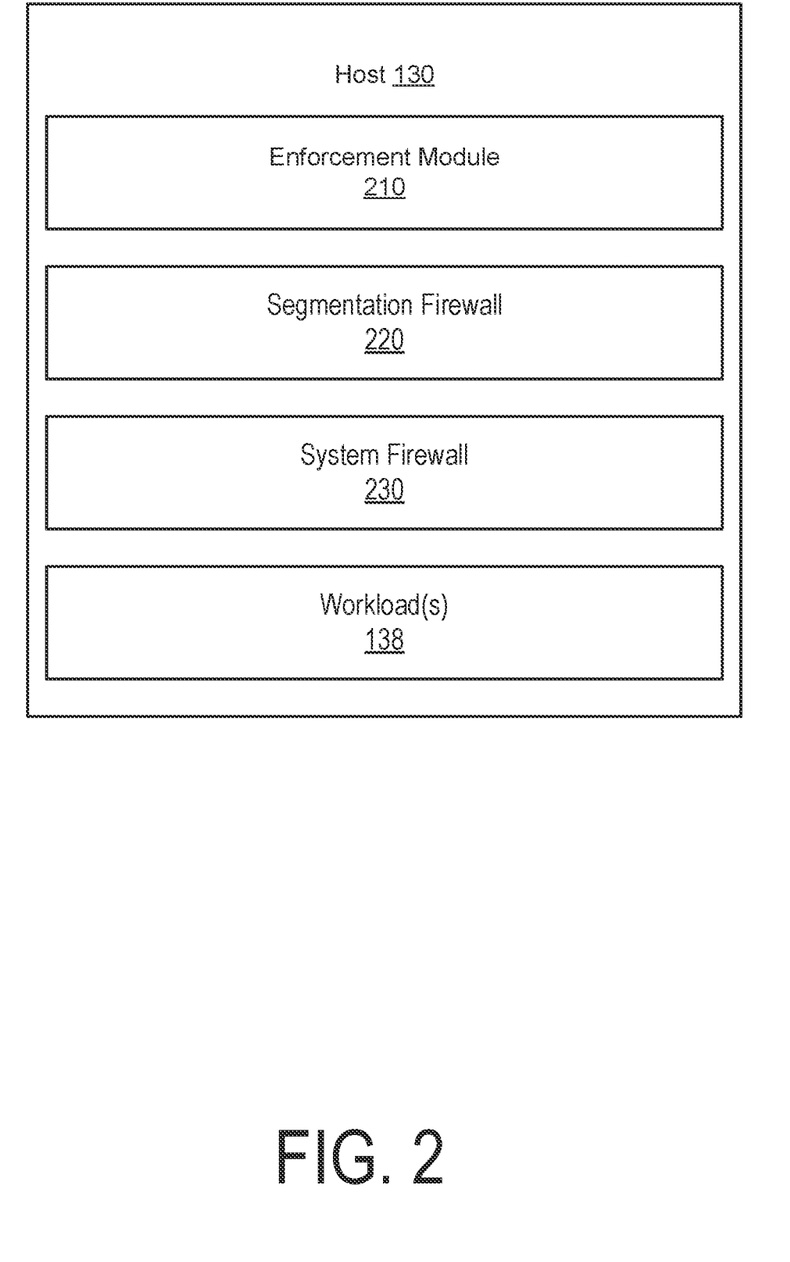
FIG. 2 is a block diagram illustrating example embodiments of a host operating in the computing environment.

FIG. 2 illustrates an example embodiment of a host 130. The host 130 comprises an enforcement module 210, a segmentation firewall 220, a system firewall 230, and one or more workloads 138. The enforcement module 210 receives the management instructions including the relevant rules and the relevant membership information from the segmentation server 120 and translates the management instructions from a high level of abstraction to a low level of abstraction to configure the segmentation firewall 220. For example, for a given rule that permits communication between a workload 138 executing on the host 130 and a group of other workloads 138 having a label set A, the enforcement module 210 determines from the relevant membership information, workload identifiers for each of the workloads 138 having the label set A, and configures firewall rules of the segmentation firewall 220 to permit communications with the identified workloads 138 in accordance with any restrictions (e.g., ports and protocols) specified in the given rule.

The segmentation firewall 220 operates to execute firewall rules that enforce the segmentation policy with respect to a workload 138 executing on the host 130. In an embodiment, the firewall rules executed on the segmentation firewall 220 are generally permissive rules that specify which specific communications are permitted by the segmentation firewall. However, the firewall rules may furthermore include a default rule that causes the segmentation firewall 220 to block communications (e.g., drop packets) that do not match any of the permissive rules. The segmentation firewall 220 may furthermore monitor and log the results of applying the firewall rules to communications it receives. For example, the log indicates whether or not the segmentation firewall determines to permit the communications based on the applied rules. The log can be provided to the segmentation server 110, which may generate a graphical representation of connections being allowed by respective segmentation firewalls 220 of the hosts 130, and may be presented to an administrator to enable the administrator to manage the segmentation policy. Furthermore, the segmentation server 110 can update the segmentation policy based on the observed communications (e.g., to permit only communications that observed under normal operation so as to prevent anomalous communications that may be malicious).

The system firewall 230 may execute firewall rules that are independent of the segmentation policy. For example, the system firewall 230 may execute firewall rules based on a security policy configured by an administrator of the administrative domain 150. The system firewall may thus serve to block communications that may otherwise be allowed by the segmentation server 220.

Each of the segmentation firewall 220 and the system firewall 230 may comprise, for example, an operating system-level firewall, an Internet Protocol security (IPsec) engine, or a network traffic filtering engine (e.g., based on the Windows Filtering Platform (WFP) development platform).

The segmentation firewall 220 may be configured to operate in a plurality of different modes including a co-existence mode in which the segmentation firewall 220 and the system firewall 230 both operate to enforce their respective firewall rules, an exclusive mode in which the segmentation firewall 220 enforces the segmentation policy and the system firewall is effectively bypassed, and a monitoring mode in which the system firewall enforces its security policy and enforcement of the segmentation policy is effectively bypassed. In each of these modes (including the monitoring mode), the segmentation firewall 220 may log the applicability of its firewall rules to a given communication and provide the logs to the segmentation server 110.

Figure 3:
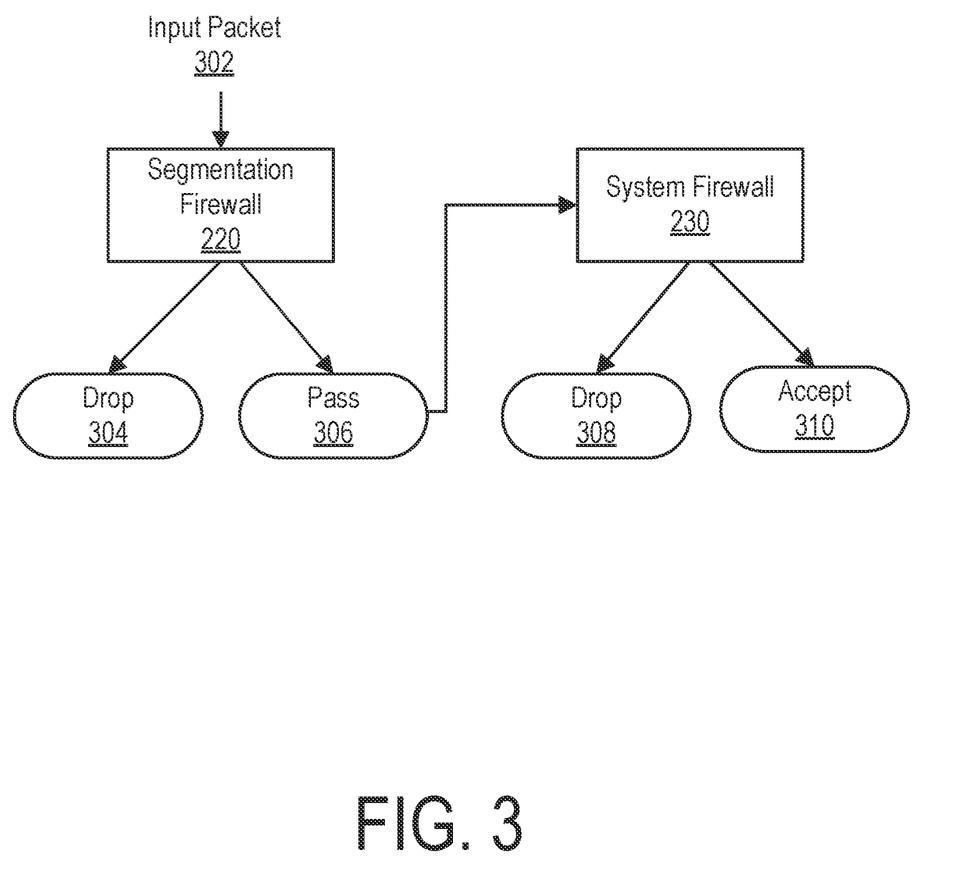
FIG. 3 is a block diagram illustrating example operation of a host processing an input packet when a segmentation firewall is configured in a co-existence mode with a system firewall.

FIG. 3 illustrates an example embodiment of interactions between the segmentation firewall 220 and the system firewall 230 when the segmentation firewall 220 is configured in the co-existence mode. Here, an input packet 302 received by the host 130 is first processed by the segmentation firewall 220. Based on the firewall rules of the segmentation firewall 220, the segmentation firewall 220 determines to either drop 304 the input packet 302 or pass 306 the input packet 302 to the system firewall 230. Thus, in this mode, the segmentation firewall 220 does not directly accept the input packet 302 (i.e., does not forward an inbound packet directly to a workload 138 or an outbound packet directly to the network 110), but rather lets the system firewall 230 determine whether or not to drop the input packet 302. If the input packet 302 is passed 306 to the system firewall 230 (i.e., is not dropped 304), the system firewall 230 then determines to either drop 308 the input packet 302 or accept 310 the input packet 302 based on the firewall rules of the system firewall 230. If the input packet 302 is accepted 310, the input packet 302 is passed to the workload 138 (for an inbound packet) or to the network 110 (for an outbound packet). As described above, the segmentation firewall 220 may furthermore log which rules, if any, match the input packet 302 and provide the log to the segmentation server 110.

Figure 4:
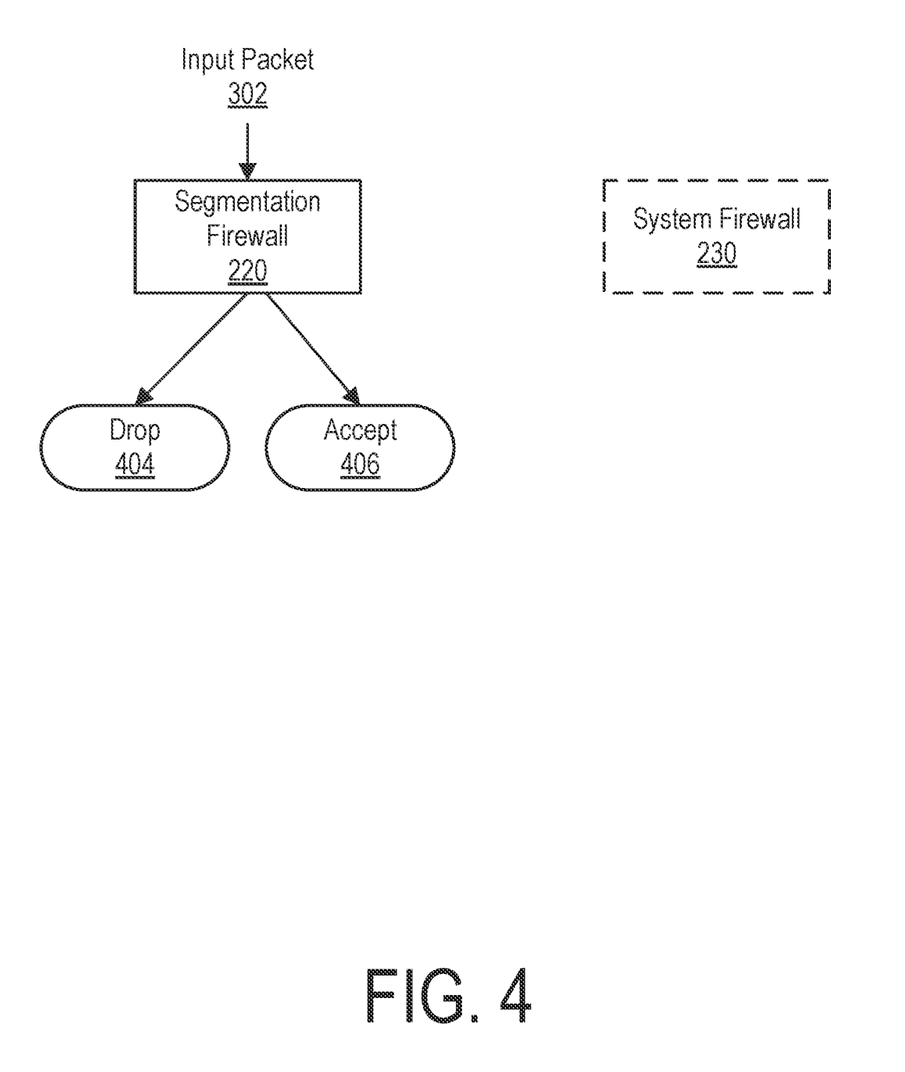
FIG. 4 is a block diagram illustrating example operation of a host processing an input packet when a segmentation firewall is configured in an exclusive mode.

FIG. 4 illustrates an example embodiment of interactions between the segmentation firewall 220 and the system firewall 230 when the segmentation firewall 220 is configured in the exclusive mode. In this mode, the segmentation firewall 220 determines to either drop 404 the input packet 302 or directly accept 406 the input packet 302. Thus, in this mode, the segmentation firewall 220 enforces the segmentation policy and the system firewall 230 is effectively bypassed. As described above, the segmentation firewall 220 may furthermore log which rules, if any, match the input packet 302 and provide the log to the segmentation server 110. Furthermore, in this embodiment, the system firewall 230 may be optionally omitted since the segmentation firewall 220 is solely responsible for enforcement.

Figure 5:
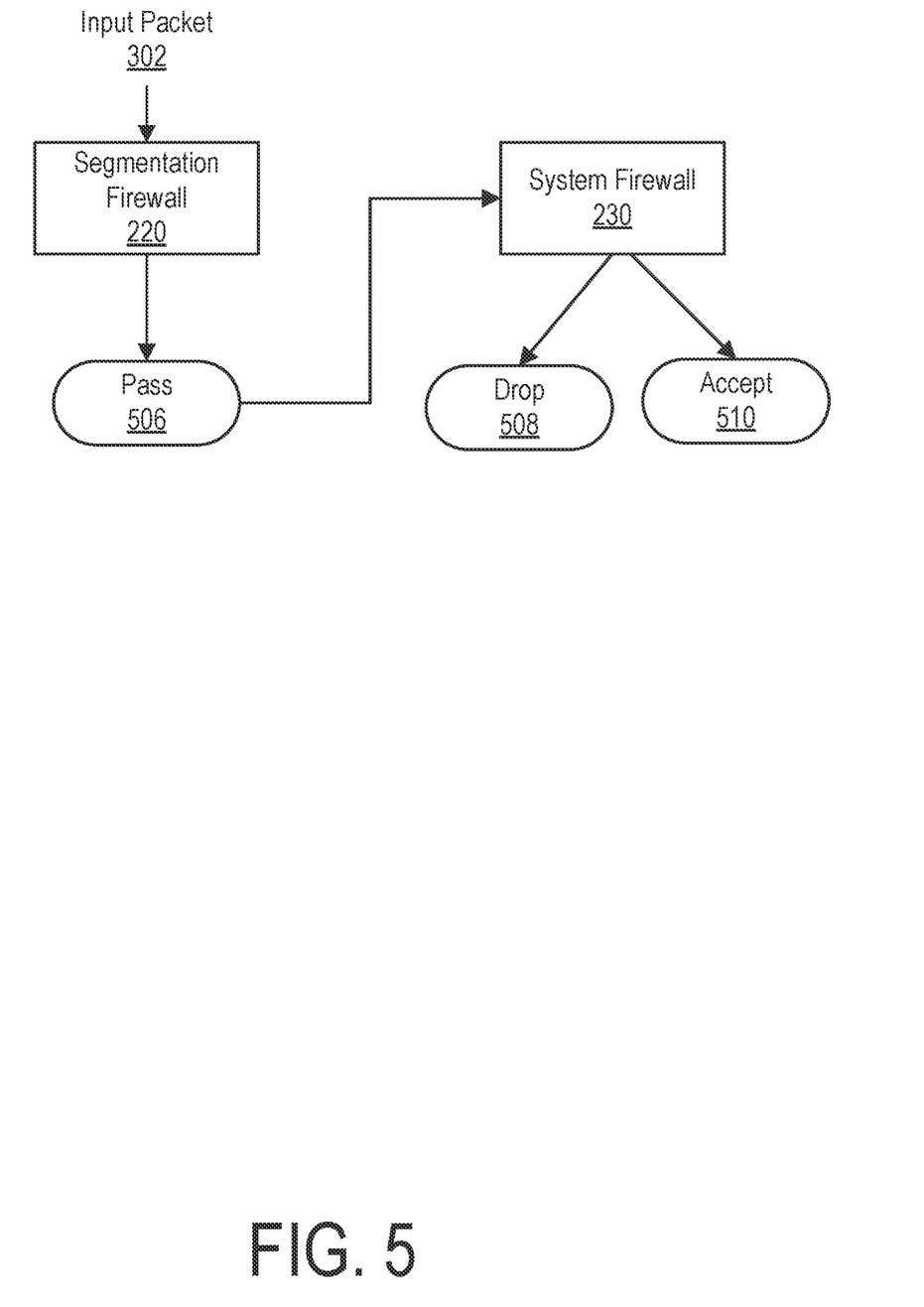
FIG. 5 is a block diagram illustrating example operation of a host processing an input packet when a segmentation firewall is configured in a monitoring mode.

FIG. 5 illustrates an example embodiment of interactions between the segmentation firewall 220 and the system firewall 230 when the segmentation firewall 220 is configured in a monitoring mode. In this mode, the segmentation firewall 220 applies its firewall rules but instead of dropping or accepting the input packet 502, the segmentation firewall 220 only logs a result of the rules and passes 504 the input packet 502 to the system firewall 230. The system firewall 230 then applies its firewall rules to determine whether to drop 506 or accept 508 the input packet 502. Thus, in this mode, the segmentation firewall 220 does not actively enforced the segmentation policy, but provides a log indicative of the behavior of the segmentation firewall 220 were it to be activated.

Figure 6:
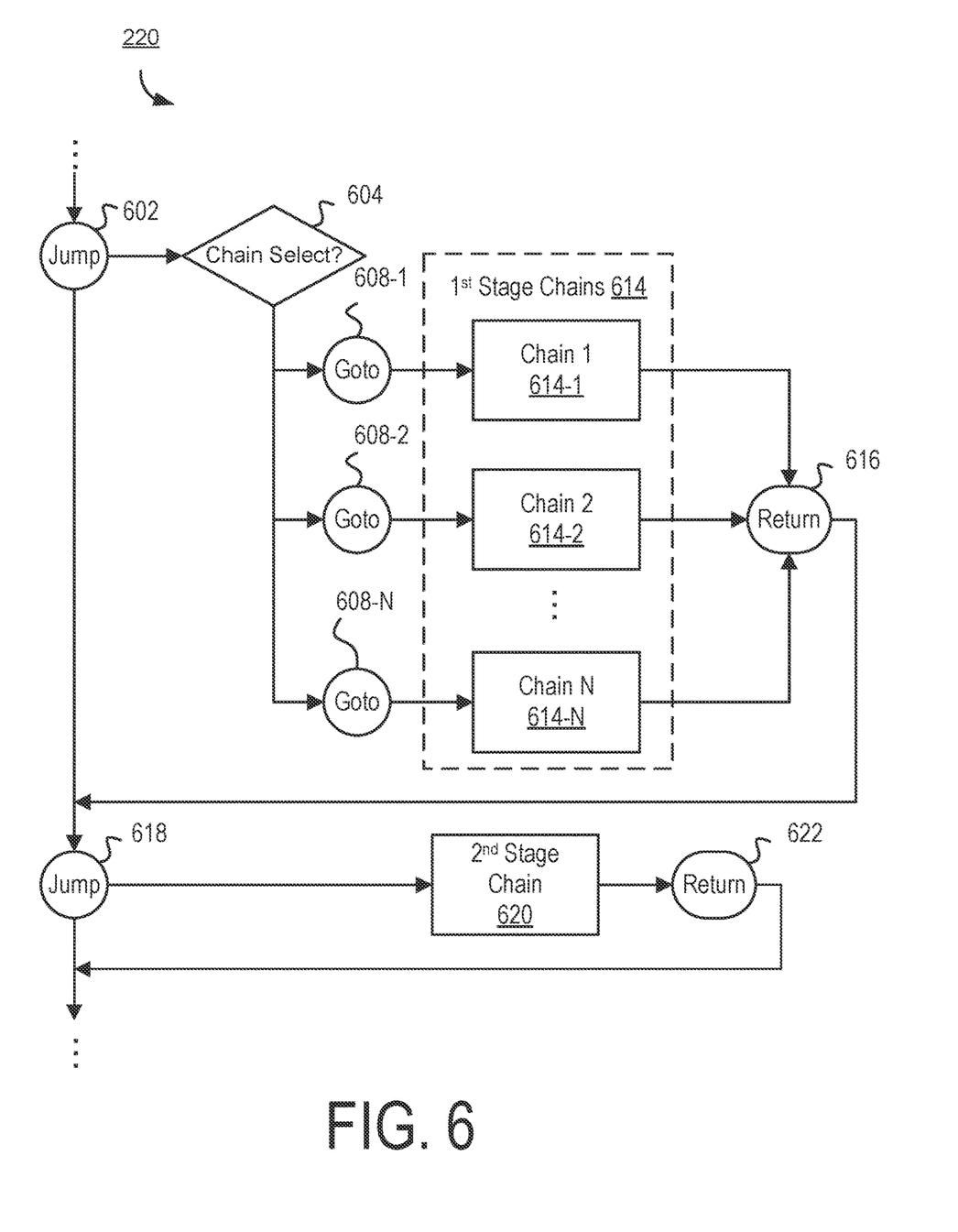
FIG. 6 is a block diagram illustrating example architecture of a segmentation firewall.

FIG. 6 illustrates an example architecture of the segmentation firewall 220 that illustrates how the firewall rules are processed. The firewall rules are organized into a plurality of chains which may include at least first stage chains 614 and at least one second stage chain 620. Each chain 614, 620 comprises an ordered set of firewall rules that may cause the segmentation firewall 220 to take a particular action on an input packet. For example, a particular rule may determine to drop the input packet, accept the input packet, or neither. If the firewall rule determines to drop the input packet, the input packet may be immediately dropped and the chain may be exited so that remaining firewall rules need not be executed. Alternatively, if the firewall rule determines to accept an input packet (e.g., when operating in exclusive mode), the input packet may be immediately accepted and the chain may be exited so that remaining firewall rules need not be executed. If the firewall rule neither drops nor accepts the input packet, the next rule in the ordered set of rules is then applied.

The first stage chains 614 may each comprise a group of related rules. For example, in one embodiment, a first stage chain 614 may correspond to a set of rules relating to a particular packet type (e.g., a TCP packet, a UDP packet, or an ICMP packet). The second stage chain 620 may furthermore be applied sequentially after one of the first stage chains 614. The second stage 620 may include different rules than the first stage chains 614 and may include rules that are independent of packet type.

The segmentation firewall 220 may furthermore utilize different types of commands for switching between different chains 614, 620. Here, a "jump" command operates as a subroutine call that jumps to a particular target chain or other module while storing a pointer to the memory location following the jump command. Upon executing the target chain or other module, the target or other module executes a return command that causes a return to the instruction location stored by the pointer, thus returning execution to the instruction immediately following the jump command. In contrast, a "goto" command operates as an inline call to a target chain or module that does not store a pointer to the memory location from which the goto command was executed. Thus, a return command following execution of the target chain or module entered via a goto command returns to the memory location of the instruction following the last jump command, rather than to the memory location of the instruction following the goto command. A combination of jump and goto commands can be used in the segmentation firewall 220 to enable the segmentation firewall 220 to execute in an efficient manner, thus reducing latency associated with processing the firewall rules.

Particularly, in the illustrated architecture, upon receiving an input packet, a jump command 602 is executed to jump to a chain selection module 604. The chain selection module 604 determines which of a plurality of first stage chains 614 to apply to the input packet. In an embodiment, the chain selection module 604 may select a first stage chain 614 based on a packet type of the input packet. For example, the first stage chains 614 may comprise a first chain 614-1 corresponding to firewall rules for processing TCP packets, second stage 614-2 for processing UDP packets, and a third stage 614-N for processing ICMP packets. The chain selection module 604 determines the appropriate chain 614 and executes a goto command 608 (e.g., goto command 608-1, goto command 608-2, . . . , goto command 608-N) to enter the selection chain 614. Following execution of the selected chain 614 a return command 616 is executed to return execution to the instruction following the jump command 602. Beneficially, by using goto commands 608 to enter one of the first stage chains 614, the remaining first stage chains 614 are effectively bypassed. This improves efficiency over architectures that rely solely on jump commands, and in which the return command 616 would instead cause execution of each chain 614 sequentially. Thus, for example, when the input packet is a TCP packet, it is unnecessary for chains corresponding to rules for UDP and ICMP packets to execute, and these chains can be bypassed.

In an embodiment, a second jump command 618 may be executed to jump to a second stage chain 620. Here, the second stage chain 620 may include various "catch-all" firewall rules that are applicable to packets regardless of the packet type. A return command 622 following execution of the second stage chain 620 returns to the instruction following the second jump command 618.

In alternative embodiments, the segmentation firewall 220 may include multiple selectable second stage chains 620 that are selected between by a second stage selection module similar to the first stage architecture described above. Additionally, in alternative embodiments, the segmentation firewall 220 may include more than two stages.

A benefit of the illustrated architecture is that the segmentation firewall 220 may execute only one of the first stage chains 614 instead of traversing all of them. By using goto commands 608 instead of jump commands to enter a chain 614, the return command 616 following the first stage chains 614 returns to the instruction following the earlier jump command 602, thereby bypassing the remaining first stage chains 614. This architecture improves efficiency and reduces latency relative to an architecture that instead traverses all of the chains until an accept or drop command is executed for a matching rule. The described architecture is particularly beneficial in a segmentation firewall 220 operating in a co-existence mode and in which the firewall rules are generally permissive, because the segmentation firewall 220 in this mode does not execute accept commands and only executes a drop command as a default rule when no other rules match the input packet. Thus, a traditional firewall architecture that is unable to bypass rule chains would likely traverse a very significant number of firewall rules for the majority of packets, thus introducing undesired latency that can be avoided with the described architecture.

Figure 7:
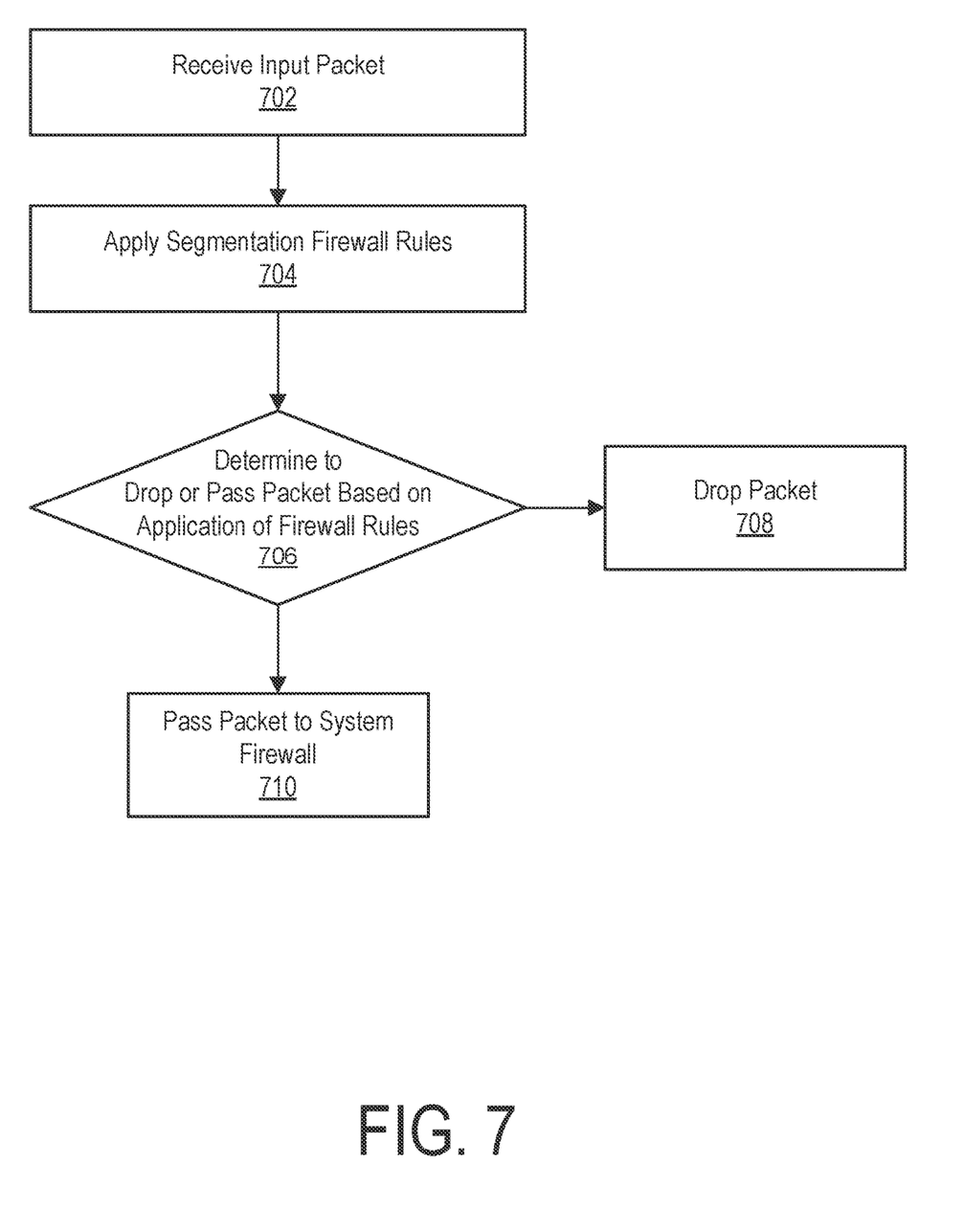
FIG. 7 is a flowchart illustrating an embodiment of a process for operating a segmentation firewall in a co-existence mode with a system firewall.

FIG. 7 illustrates an embodiment of a process for operating a segmentation firewall 220 in a co-existence mode with a system firewall 230. The segmentation firewall 220 receives 702 an input packet. The segmentation firewall 220 applies 704 segmentation firewall rules to the input packet to determine 706 to drop the input packet or pass the input packet to the system firewall 230. In response to determining to drop the input packet, the segmentation server 220 drops 708 the input packet. For example, the segmentation firewall 220 may determine to drop the input packet in response to the input packet failing to match any permissive rules of the segmentation policy that permit the communication. Otherwise, responsive to the segmentation server 220 determining to pass the packet, the segmentation server passes 710 the input packet to the system firewall 230 to enable the system firewall 230 to determine whether to accept or drop the input packet based on its security policy. For example, the segmentation firewall 220 may determine to pass the input packet to the system firewall 230 in response to the input packet matching one of the permissive rules of the segmentation policy that permits the communication.

Figure 8:
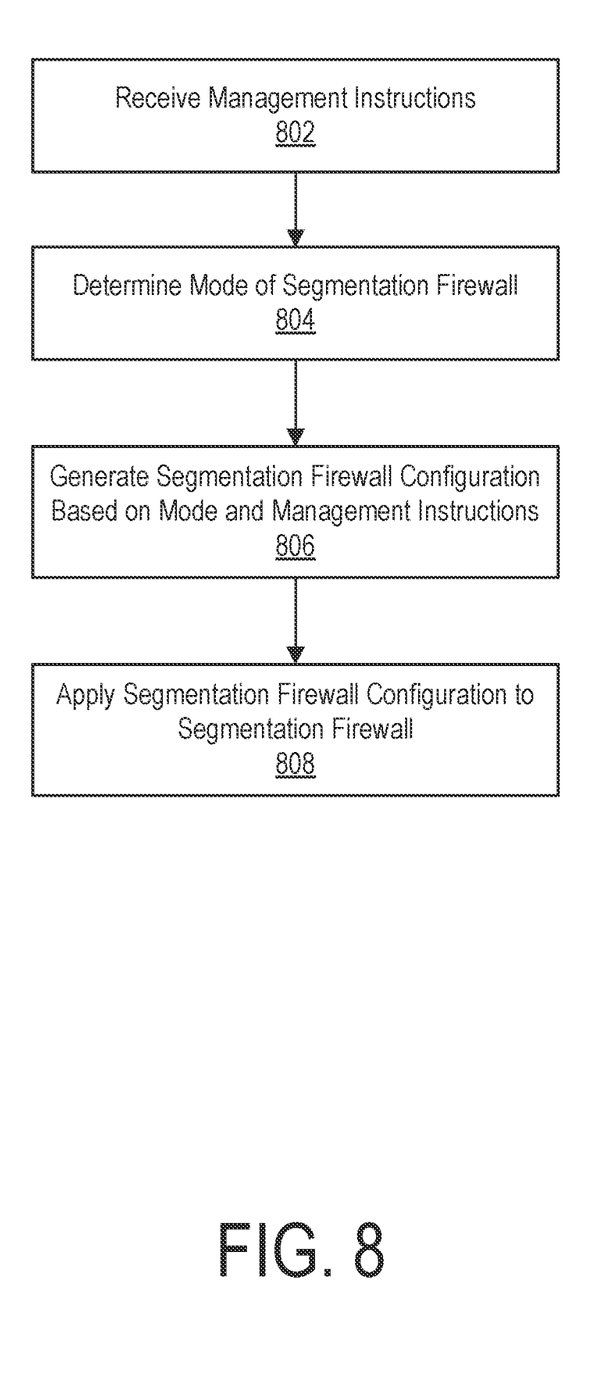
FIG. 8 is a flowchart illustrating an embodiment of a process for configuring a segmentation firewall based on a segmentation policy.

FIG. 8 illustrates an embodiment of a process performed by an enforcement module 210 of a host 130 for configuring a segmentation firewall 220. The enforcement module 210 receives 802 management instructions from the segmentation server 120 setting forth a set of rules indicative of permitted communications by a workload 138 executing on the host 130. The enforcement module 210 determines 804 a configured mode of the segmentation firewall 220. For example, as described above, the segmentation firewall 220 may be configured to operate in either a co-existence mode, an exclusive mode, or a monitoring mode. The enforcement module 210 generates 806 the configuration of the segmentation firewall based on the mode and the management instructions. Here, the enforcement module 210 generates firewall rules to enforce the management instructions of the segmentation policy with respect to communications to and from the workload 138. If operating in a co-existence mode, the firewall rules are generated such that the segmentation firewall 220 passes input packets to the system firewall 230 that match a permissive rule of the segmentation policy and otherwise drops input packets that do not match any of the permissive rules. If operating in an exclusive mode, the firewall rules are generated such that the segmentation firewall 220 accepts input packets that match a permissive rule of the segmentation policy (thereby bypassing the system firewall 230) and otherwise drops input packets that do not match any of the permissive rules. If operating in a monitoring mode, the firewall rules are generated such that the segmentation firewall 220 only monitors and logs which rules, if any, an input packet matches, and then passes the input packet to the system firewall 230. In an embodiment, when operating in the co-existence mode or the exclusive mode, the segmentation firewall 220 may similarly be configured to perform the monitoring and logging in addition to the enforcement functions. The enforcement module 210 then applies 808 the generated configuration to the segmentation firewall 808.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for processing an input packet at a host device in accordance with firewall rules of a segmentation firewall that enforces a segmentation policy on the host device and that co-exists with a system firewall of the host device, the method comprising:
    configuring the segmentation firewall in a co-existence mode;
    receiving a first input packet at the host device;
    responsive to the segmentation firewall determining that the first input packet should be accepted, passing control of the first input packet to the system firewall of the host device to enable the system firewall to determine whether to drop or accept the first input packet;
    switching operation of the segmentation firewall to an exclusive mode;
    receiving a second input packet with the segmentation firewall operating in the exclusive mode;
    applying the segmentation firewall rules of the segmentation firewall to determine whether to drop or accept the second input packet, wherein accepting the second input packet provides the second input packet to its destination by bypassing the system firewall; and
    dropping or accepting the second input packet dependent on application of the segmentation firewall rules.

2. The method of claim 1, further comprising:
    determining, by the system firewall, whether to drop or accept the first input packet based on security firewall rules associated with the system firewall;
    dropping the first input packet responsive to the system firewall determining to drop the first input packet; and
    passing the first input packet to a workload or to a network responsive to the system firewall determining to accept the first input packet.

3. The method of claim 1, further comprising:
    applying permissive segmentation firewall rules of a rule chain of the segmentation firewall executing on the host device to determine if the first input packet meets respective criteria of each of the segmentation firewall rules; and
    responsive to the first input packet meeting criteria specified in one of the segmentation firewall rules, executing a command to exit the rule chain without dropping or accepting the first input packet,
    wherein passing control of the first input packet to the system firewall is further responsive to executing the command to exit the rule chain.

4. The method of claim 3, wherein applying the permissive segmentation firewall rules comprises:
    executing a first jump command of an input module to jump to a chain selection module of the segmentation firewall;
    selecting, by the chain selection module, a first rule chain of the segmentation firewall;
    executing, in the chain selection module, a goto command to go to the first rule chain of the segmentation firewall;
    executing first firewall rules in the first rule chain; and
    responsive to completing execution of the first firewall rules without dropping the first input packet, executing a first return command to return to a first memory location of an instruction of the input module following the first jump command.

5. The method of claim 4, further comprising:
    executing a second jump command to a second rule chain of the segmentation firewall;
    executing second firewall rules in the second rule chain; and
    responsive to completing execution of the second firewall rules without dropping the first input packet, executing a second return command to return to a second memory location of an instruction of the input module following the second jump command.

6. The method of claim 5, further comprising passing, by the input module, the first input packet to the system firewall following the second return command.

7. The method of claim 4, wherein selecting the first rule chain of the segmentation firewall comprises:
    determining a packet type of the first input packet; and
    selecting the first rule chain from a set of selectable rule chains based on the packet type.

8. The method of claim 1, further comprising:
    switching operation of the segmentation firewall to a monitoring mode;
    receiving a third input packet with the segmentation firewall operating in the monitoring mode;
    applying the segmentation firewall rules of the segmentation firewall and logging results of the application of the segmentation firewall rules without dropping or accepting the third input packet; and
    storing a log of the results.

9. A non-transitory computer-readable storage medium storing instructions for generating firewall rules of a segmentation firewall that enforces a segmentation policy and that co-exists with a system firewall, the instructions when executed by a computing system causing the computing system to perform operations comprising:
    configuring the segmentation firewall in a co-existence mode;
    receiving a first input packet at a host device;
    responsive to the segmentation firewall determining that the first input packet should be accepted, passing control of the first input packet to the system firewall of the host device to enable the system firewall to determine whether to drop or accept the first input packet;
    switching operation of the segmentation firewall to an exclusive mode;
    receiving a second input packet with the segmentation firewall operating in the exclusive mode;
    applying the segmentation firewall rules of the segmentation firewall to determine whether to drop or accept the second input packet, wherein accepting the second input packet provides the second input packet to its destination by bypassing the system firewall; and
    dropping or accepting the second input packet dependent on application of the segmentation firewall rules.

10. The non-transitory computer-readable storage medium of claim 9, wherein the operations further comprise:
    determining, by the system firewall, whether to drop or accept the first input packet based on security firewall rules associated with the system firewall;

dropping the first input packet responsive to the system firewall determining to drop the first input packet; and passing the first input packet to a workload or to a network responsive to the system firewall determining to accept the first input packet.

11. The non-transitory computer-readable storage medium of claim 9, wherein the operations further comprise:

applying permissive segmentation firewall rules of a rule chain of the segmentation firewall executing on the host device to determine if the first input packet meets respective criteria of each of the segmentation firewall rules; and responsive to the first input packet meeting criteria specified in one of the segmentation firewall rules, executing a command to exit the rule chain without dropping or accepting the first input packet, wherein passing control of the first input packet to the system firewall is further responsive to executing the command to exit the rule chain.

12. The non-transitory computer-readable storage medium of claim 11, wherein applying the permissive segmentation firewall rules comprises:

executing a first jump command of an input module to jump to a chain selection module of the segmentation firewall;

selecting, by the chain selection module, a first rule chain of the segmentation firewall;

executing, in the chain selection module, a goto command to go to the first rule chain of the segmentation firewall;

executing first firewall rules in the first rule chain;

responsive to completing execution of the first firewall rules without dropping the first input packet, executing a first return command to return to a first memory location of an instruction of the input module following the first jump command.

13. The non-transitory computer-readable storage medium of claim 12, wherein the operations further comprise:

executing a second jump command to a second rule chain of the segmentation firewall;

executing second firewall rules in the second rule chain; and responsive to completing execution of the second firewall rules without dropping the first input packet, executing a second return command to return to a second memory location of an instruction of the input module following the second jump command.

14. The non-transitory computer-readable storage medium of claim 13, wherein the operations further comprise passing, by the input module, the first input packet to the system firewall following the second return command.

15. The non-transitory computer-readable storage medium of claim 12, wherein selecting the first rule chain of the segmentation firewall comprises:

determining a packet type of the first input packet; and selecting the first rule chain from a set of selectable rule chains based on the packet type.

16. The non-transitory computer-readable storage medium of claim 9, wherein the operations further comprise:

switching operation of the segmentation firewall to a monitoring mode;

receiving a third input packet with the segmentation firewall operating in the monitoring mode;

applying the segmentation firewall rules of the segmentation firewall and logging results of the application of the segmentation firewall rules without dropping or accepting the third input packet; and storing a log of the results.

17. A system for generating firewall rules of a segmentation firewall that enforces a segmentation policy and that co-exists with a system firewall, the system comprising:

one or more processors; and a memory storing instructions that, when executed by the one or more processors, cause the one or more processors to perform operations including:

configuring the segmentation firewall in a co-existence mode;

receiving a first input packet at a host device;

responsive to the segmentation firewall determining that the first input packet should be accepted, passing control of the first input packet to the system firewall of the host device to enable the system firewall to determine whether to drop or accept the first input packet;

switching operation of the segmentation firewall to an exclusive mode;

receiving a second input packet with the segmentation firewall operating in the exclusive mode;

applying the segmentation firewall rules of the segmentation firewall to determine whether to drop or accept the second input packet, wherein accepting the second input packet provides the second input packet to its destination by bypassing the system firewall; and dropping or accepting the second input packet dependent on application of the segmentation firewall rules.

18. The system of claim 17, wherein the operations further include:

applying permissive segmentation firewall rules of a rule chain of the segmentation firewall executing on the host device to determine if the first input packet meets respective criteria of each of the segmentation firewall rules; and responsive to the first input packet meeting criteria specified in one of the segmentation firewall rules, executing a command to exit the rule chain without dropping or accepting the first input packet, wherein passing control of the first input packet to the system firewall is further responsive to executing the command to exit the rule chain.

19. The system of claim 18, wherein applying the permissive segmentation firewall rules comprises:

executing a first jump command of an input module to jump to a chain selection module of the segmentation firewall;

selecting, by the chain selection module, a first rule chain of the segmentation firewall;

executing, in the chain selection module, a goto command to go to the first rule chain of the segmentation firewall;

executing first firewall rules in the first rule chain;

responsive to completing execution of the first firewall rules without dropping the first input packet, executing a first return command to return to a first memory location of an instruction of the input module following the first jump command.

20. The system of claim 19, wherein selecting the first rule chain of the segmentation firewall comprises:

determining a packet type of the first input packet; and selecting the first rule chain from a set of selectable rule chains based on the packet type.

* * * * *